(12) United States Patent  (10) Patent No.: US 7,830,759 B2
Horiguchi  (45) Date of Patent: Nov. 9, 2010

(54) OBJECTIVE LENS DRIVE, OPTICAL PICKUP, AND OPTICAL DISC APPARATUS

(75) Inventor: Muneyuki Horiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 11/876,309

(22) Filed: Oct. 22, 2007

(65) Prior Publication Data

US 2008/0137518 A1 Jun. 12, 2008

(30) Foreign Application Priority Data

Dec. 12, 2006 (JP) .............................. 2006-334690

(51) Int. Cl.
*G11B 7/00* (2006.01)
(52) U.S. Cl. ..................... 369/44.32; 720/683
(58) Field of Classification Search ........................ None
See application file for complete search history.

(56) References Cited

U.S. PATENT DOCUMENTS 7,221,523 B2 * 5/2007 Miyagi ....................... 359/819
7,515,364 B2 * 4/2009 Takahashi .................... 359/813
2007/0165500 A1 * 7/2007 Sato ......................... 369/44.32

FOREIGN PATENT DOCUMENTS

| JP | 10-11765 | 1/1998 |
|---|---|---|
| JP | 2006-19001 | 1/2006 |
| JP | 2008-84368 | 4/2008 |

* cited by examiner

*Primary Examiner*—Joseph H Feild
*Assistant Examiner*—Tawfik Goma
(74) *Attorney, Agent, or Firm*—Oblon, Spivak, McClelland, Maier & Neustadt, L.L.P.

(57) ABSTRACT

An objective lens drive includes a lens holder holding first and second objective lenses and moved at least in a focusing direction substantially parallel to optical axes of the objective lenses and in a tracking direction orthogonal to the focusing direction; a support supporting the lens holder movably at least in the focusing and tracking directions; a first adjusting unit provided between the first objective lens and the lens holder and adjusting a tilt of the first objective lens in a direction about an axis in a first direction being any direction in a plane orthogonal to the focusing direction; and a second adjusting unit provided between the second objective lens and the lens holder and adjusting a tilt of the second objective lens in a direction about an axis in a second direction being in a plane orthogonal to the focusing direction and substantially orthogonal to the first direction.

4 Claims, 9 Drawing Sheets

US 7,830,759 B2

OBJECTIVE LENS DRIVE, OPTICAL PICKUP, AND OPTICAL DISC APPARATUS

CROSS REFERENCES TO RELATED APPLICATIONS

The present invention contains subject matter related to Japanese Patent Application JP 2006-334690 filed in the Japanese Patent Office on Dec. 12, 2006, the entire contents of which are incorporated herein by reference.

BACKGROUND OF THE INVENTION

1. Field of the Invention

The present invention relates to an objective lens drive included in an optical pickup capable of recording an information signal on an optical disc and reproducing an information signal recorded on the optical disc, relates to an optical pickup including the objective lens drive, and further relates to an optical disc apparatus including the optical pickup.

2. Description of the Related Art

Various types of optical discs have been used as recording media for recording an information signal thereon. Examples of such optical discs include a compact disc (CD), a digital versatile disc (DVD), and a high-density recording optical disc on which high-density recording and reproduction of a signal is performed using a blue-violet semiconductor laser or the like capable of emitting a light beam having a wavelength of about 405 nm. Also, an optical pickup has been used to record an information signal on or reproduce a recorded information signal from these types of optical discs.

There have been demands for an optical pickup that can provide compatibility with these various types of optical discs. To provide compatibility with optical discs which involve the use of light beams of different wavelengths or have protective layers of different thicknesses, there is provided an optical pickup having a plurality of objective lenses.

An optical pickup having a plurality of objective lenses includes an objective lens drive which includes both a fixed part and a movable part. The movable part of the objective lens drive includes, for example, two objective lenses arranged side by side in a tangential direction or radial direction. The optical pickup uses a different objective lens depending on the format and type of the optical disc.

For such an objective lens drive having two objective lenses in its movable part and an optical pickup having the objective lens drive, it is desirable that the optical axes of the objective lenses be adjusted to be in an optimal state with respect to the optical disc.

For example, Japanese Unexamined Patent Application Publication No. 10-11765 describes a technique in which a spherical washer or the like is provided for skew adjustment which makes the optical axis of a second objective lens parallel with respect to a first objective lens. After the optical axis of the second objective lens is made parallel to that of the first objective lens by using a spherical washer or the like, a movable part is adjusted, when it is attached to a fixed part, such that the optical axis of the first objective lens is made orthogonal to the plane of the optical disc. Thus, the optical axes of the respective objective lenses are adjusted to be, for example, perpendicular to the plane of the optical disc.

However, an adjusting means, such as the spherical washer, for adjusting the optical axis of one objective lens in two axial directions is complex in configuration. Moreover, providing such an adjusting means increases the number of components and weight, and makes it necessary to go through complicated processes since fine adjustment needs to be repeated.

SUMMARY OF THE INVENTION

Accordingly, it is desirable to provide an objective lens drive, an optical pickup, and an optical disc apparatus that make it possible, with a simple configuration, to adjust a relative attachment angle between a plurality of objective lenses.

According to an embodiment of the present invention, there is provided an objective lens drive including a lens holder to which a first objective lens and a second objective lens that have different specifications are attached, the lens holder being moved at least in a focusing direction substantially parallel to optical axes of the first and second objective lenses and in a tracking direction orthogonal to the focusing direction; a support configured to movably support the lens holder at least in the focusing direction and in the tracking direction; a first adjusting unit provided between the first objective lens and the lens holder and configured to adjust a tilt of the first objective lens in a direction about an axis in a first direction that is any direction in a plane orthogonal to the focusing direction; and a second adjusting unit provided between the second objective lens and the lens holder and configured to adjust a tilt of the second objective lens in a direction about an axis in a second direction that is in a plane orthogonal to the focusing direction and is substantially orthogonal to the first direction. A relative angle between the first and second objective lenses is adjusted by tilt adjustment that is made possible by the first and second adjusting units.

According to another embodiment of the present invention, there is provided an optical pickup including a first objective lens and a second objective lens that have different specifications and are capable of converging light beams onto a signal recording surface of various types of optical discs rotated by a driving force; and an objective lens drive configured to drive the first and second objective lenses. The objective lens drive includes a lens holder to which the first objective lens and the second objective lens are attached, the lens holder being moved at least in a focusing direction substantially parallel to optical axes of the first and second objective lenses and in a tracking direction orthogonal to the focusing direction; a support configured to movably support the lens holder at least in the focusing direction and in the tracking direction; a first adjusting unit provided between the first objective lens and the lens holder and configured to adjust a tilt of the first objective lens in a direction about an axis in a first direction that is any direction in a plane orthogonal to the focusing direction; and a second adjusting unit provided between the second objective lens and the lens holder and configured to adjust a tilt of the second objective lens in a direction about an axis in a second direction that is in a plane orthogonal to the focusing direction and is substantially orthogonal to the first direction. A relative angle between the first and second objective lenses is adjusted by tilt adjustment that is made possible by the first and second adjusting units.

According to another embodiment of the present invention, there is provided an optical disc apparatus including a drive unit configured to hold and rotate various types of optical discs; and an optical pickup configured to emit a light beam for recording or reproducing an information signal on or from an optical disc rotated by the drive unit, and to detect a light beam reflected off the optical disc. The optical pickup includes a first objective lens and a second objective lens that have different specifications and are capable of converging light beams onto a signal recording surface of various types of optical discs rotated by a driving force; and an objective lens drive configured to drive the first and second objective lenses. The objective lens drive includes a lens holder to which the first objective lens and the second objective lens are attached, the lens holder being moved at least in a focusing direction substantially parallel to optical axes of the first and second objective lenses and in a tracking direction orthogonal to the focusing direction; a support configured to movably support the lens holder at least in the focusing direction and in the tracking direction; a first adjusting unit provided between the first objective lens and the lens holder and configured to adjust a tilt of the first objective lens in a direction about an axis in a first direction that is any direction in a plane orthogonal to the focusing direction; and a second adjusting unit provided between the second objective lens and the lens holder and configured to adjust a tilt of the second objective lens in a direction about an axis in a second direction that is in a plane orthogonal to the focusing direction and is substantially orthogonal to the first direction. A relative angle between the first and second objective lenses is adjusted by tilt adjustment that is made possible by the first and second adjusting units.

According to at least one embodiment of the present invention, an adjustment of a relative attachment angle between a plurality of objective lenses can be easily made, with a reduced number of components and a simplified configuration, by providing the first adjusting unit for adjusting a tilt of the first objective lens in the direction about the axis in the first direction and the second adjusting unit for adjusting a tilt of the second objective lens in the direction about the axis in the second direction substantially orthogonal to the first direction.

BRIEF DESCRIPTION OF THE DRAWINGS

FIG. 11A is a plan view of a first magnet arranged at a front end of the optical pickup as viewed from the lens holder side. FIG. 11B is a plan view of a second magnet arranged at a rear end of the optical pickup as viewed from the lens holder side.

DESCRIPTION OF THE PREFERRED EMBODIMENTS

An optical disc apparatus including an optical pickup according to an embodiment of the present invention will now be described with reference to the drawings.

Figure 1:
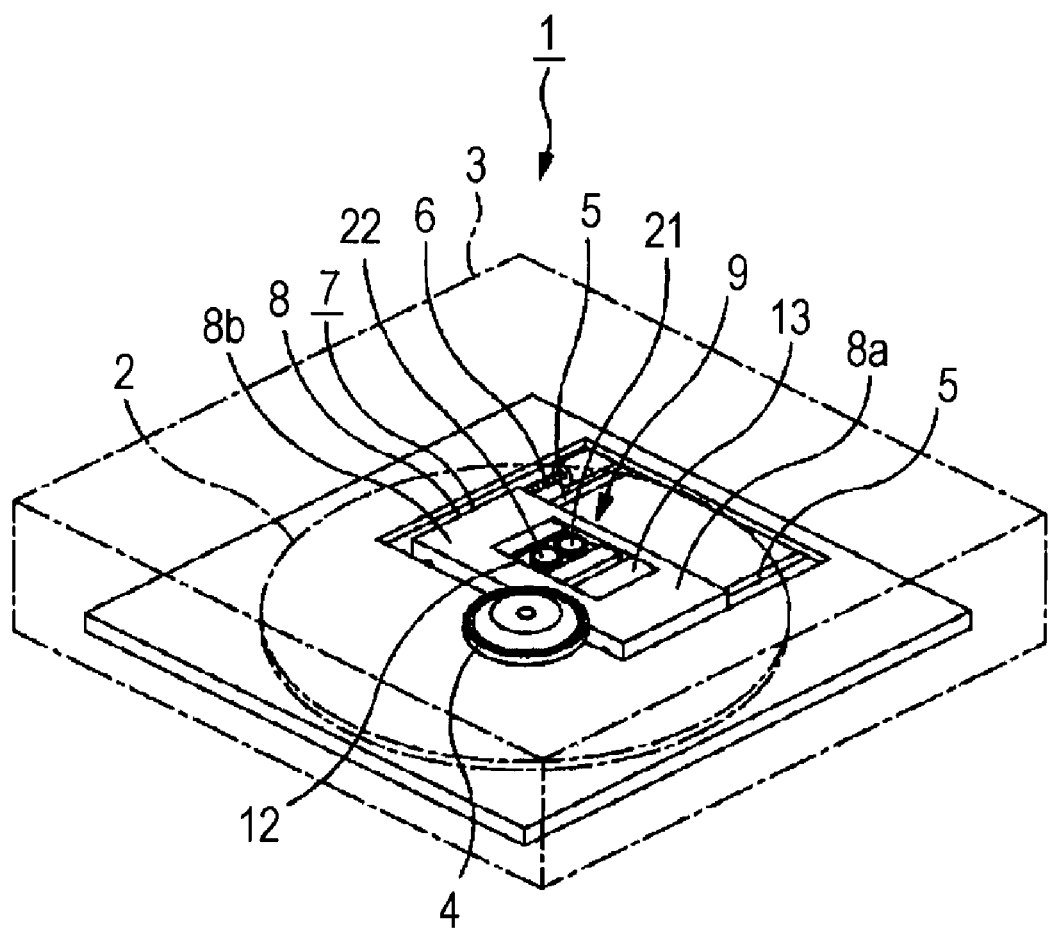
FIG. 1 is a perspective view of an optical disc apparatus including an optical pickup according to an embodiment of the present invention.
Figure 1:
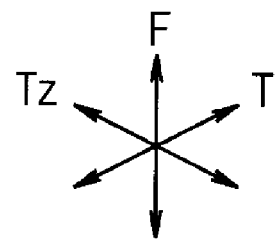

As illustrated in FIG. 1, an optical disc apparatus 1 according to an embodiment of the present invention is a recording/reproducing apparatus which records and/or reproduces an information signal on and/or from an optical disc 2.

Examples of the optical disc 2 with respect to which the optical disc apparatus 1 performs recording and/or reproduction include a CD, a DVD, a CD recordable (CD-R) and a DVD recordable (DVD-R) on which information is recordable, a CD rewritable (CD-RW) and a DVD rewritable (DVD-RW) to which information is rewritable, and a high-density recording optical disc and a magneto-optical disc which allow high-density recording through the use of a semiconductor laser capable of emitting a light beam having a short wavelength of about 405 nm (i.e., a blue-violet laser beam).

As illustrated in FIG. 1, the optical disc apparatus 1 includes an outer housing 3 in which components and mechanisms are disposed. The outer housing 3 has a disc insertion slot (not shown).

The outer housing 3 includes a chassis (not shown). A disc table 4 is secured to a motor shaft of a spindle motor attached to the chassis.

Parallel guide shafts 5 are attached to the chassis, which supports a lead screw 6 rotated by a feed motor (not shown).

As illustrated in FIG. 1, an optical pickup 7 includes a moving base 8, optical components mounted on the moving base 8, and an objective lens drive 9 disposed on the moving base 8. Bearings 8a and 8b on opposite sides of the moving base 8 are freely slidably supported by the respective guide shafts 5.

When a nut member (not shown) provided on the moving base 8 is brought into engagement with the lead screw 6, which is then rotated by the feed motor, the nut member is moved in a direction corresponding to a rotating direction of the lead screw 6, while the optical pickup 7 is moved in a radial direction of the optical disc 2 placed on the disc table 4.

In the optical disc apparatus 1 configured as described above, the spindle motor rotates the optical disc 2, drive-controls the lead screw 6 according to a control signal from a servo circuit, and moves the optical pickup 7 to a position corresponding to a desired recording track on the optical disc 2. Thus, the optical disc apparatus 1 performs recording and/or reproduction of information with respect to the optical disc 2.

The optical pickup 7 is included in an optical disc apparatus which performs recording and/or reproduction of an information signal on various types of optical discs with respect to which recording or reproduction of an information signal is performed by selectively using various types of light beams having different wavelengths. Specifically, the following description will be made on the assumption that an information signal is recorded on and/or reproduced from a first optical disc with respect to which recording or reproduction of an information signal is performed using a light beam with a wavelength of about 400 nm to 410 nm, a second optical disc with respect to which recording or reproduction of an information signal is performed using a light beam with a wavelength of about 650 nm to 660 nm, and a third optical disc with respect to which recording or reproduction of an information signal is performed using a light beam with a wavelength of about 760 nm to 800 nm.

The following description will be made on the assumption that the optical pickup 7 records and/or reproduces an information signal on and/or from the three different types of optical discs described above. However, recording and/or reproduction of an information signal may be performed on any other types of optical discs which involve the use of light beams of different wavelengths or have protective layers of different thicknesses.

The optical pickup 7 according to an embodiment of the present invention includes a semiconductor laser, a photodiode, and an optical system. The semiconductor laser serves as a light source capable of emitting various types of light beams having different wavelengths. The photodiode serves as a light-sensitive detector capable of detecting a reflected light beam reflected off a signal recording surface of the optical disc 2. The optical system guides a light beam from the semiconductor laser to the optical disc 2 and also guides a light beam reflected off the optical disc 2 to the photodiode.

Figure 2:
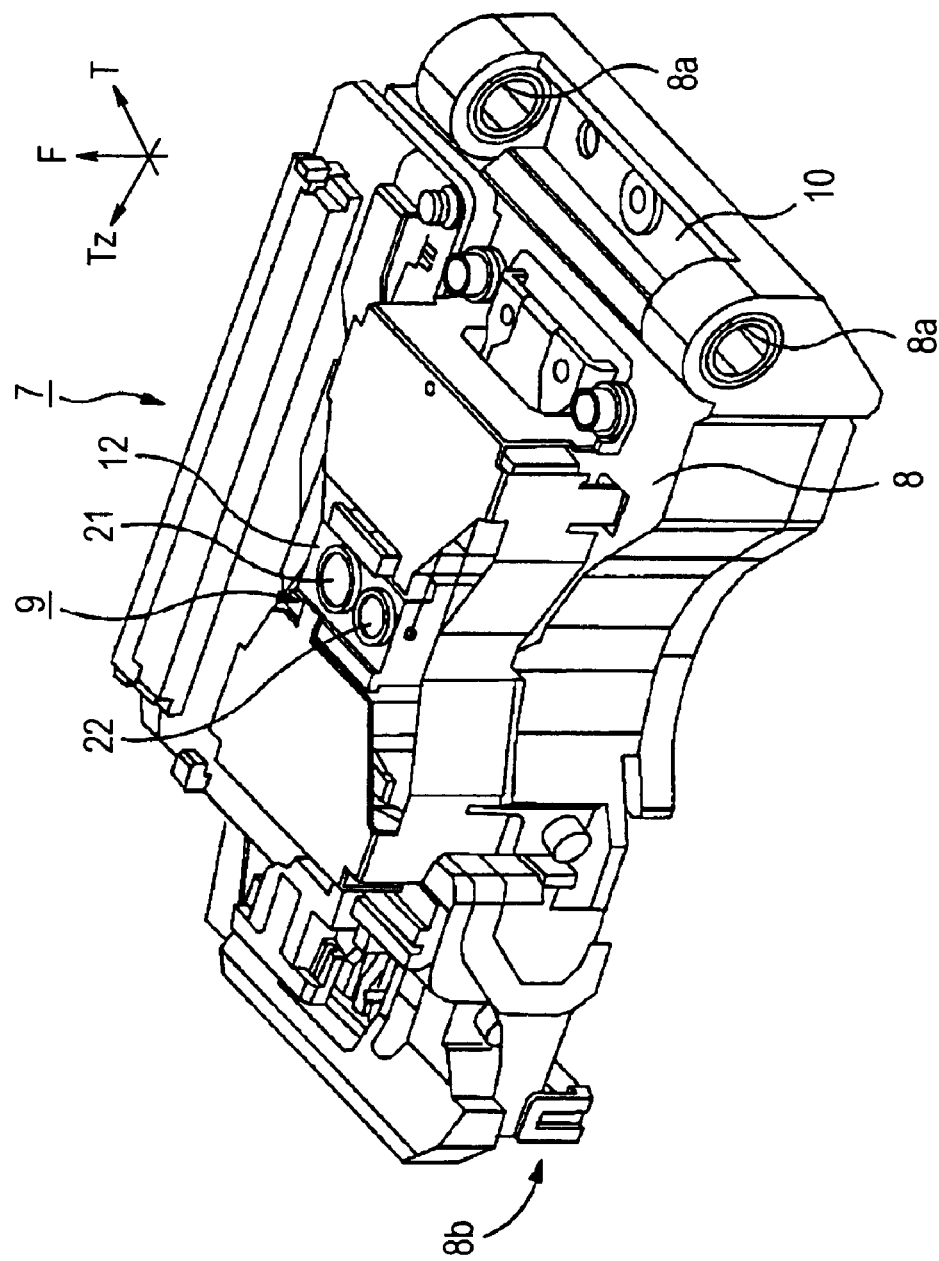
FIG. 2 is a perspective view illustrating the optical pickup of the embodiment.
Figure 3:
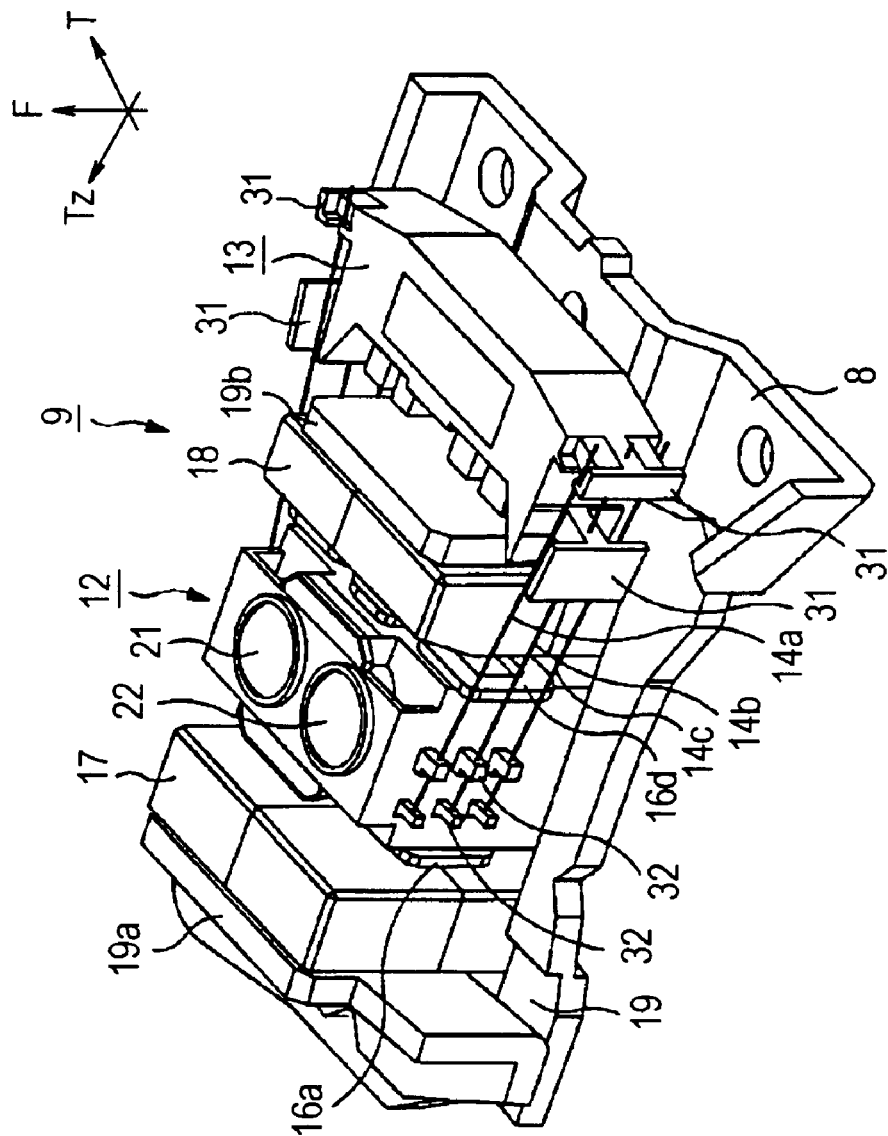
FIG. 3 is a perspective view illustrating the optical pickup and an objective lens drive of the embodiment.

As illustrated in FIG. 2 and FIG. 3, the optical pickup 7 further includes a mounting base 10 on which the above-described optical system is disposed, and the objective lens drive 9 disposed on the mounting base 10. The mounting base 10 is disposed movably, in a radial direction of the optical disc 2, inside the outer housing 3 (see FIG. 1) of the optical disc apparatus 1. The mounting base 10 has bearings 8a and 8b at its opposite ends. The bearings 8a and 8b are freely slidably supported by the respective guide shafts 5 (see FIG. 1) on the mounting base 10. When a rack member (not shown) provided on the mounting base 10 is brought into engagement with the lead screw 6 (see FIG. 1), which is then rotated by the feed motor, the rack member is moved in a direction according to a rotating direction of the lead screw 6, while the optical pickup 7 is moved in a radial direction of the optical disc 2.

Figure 4:
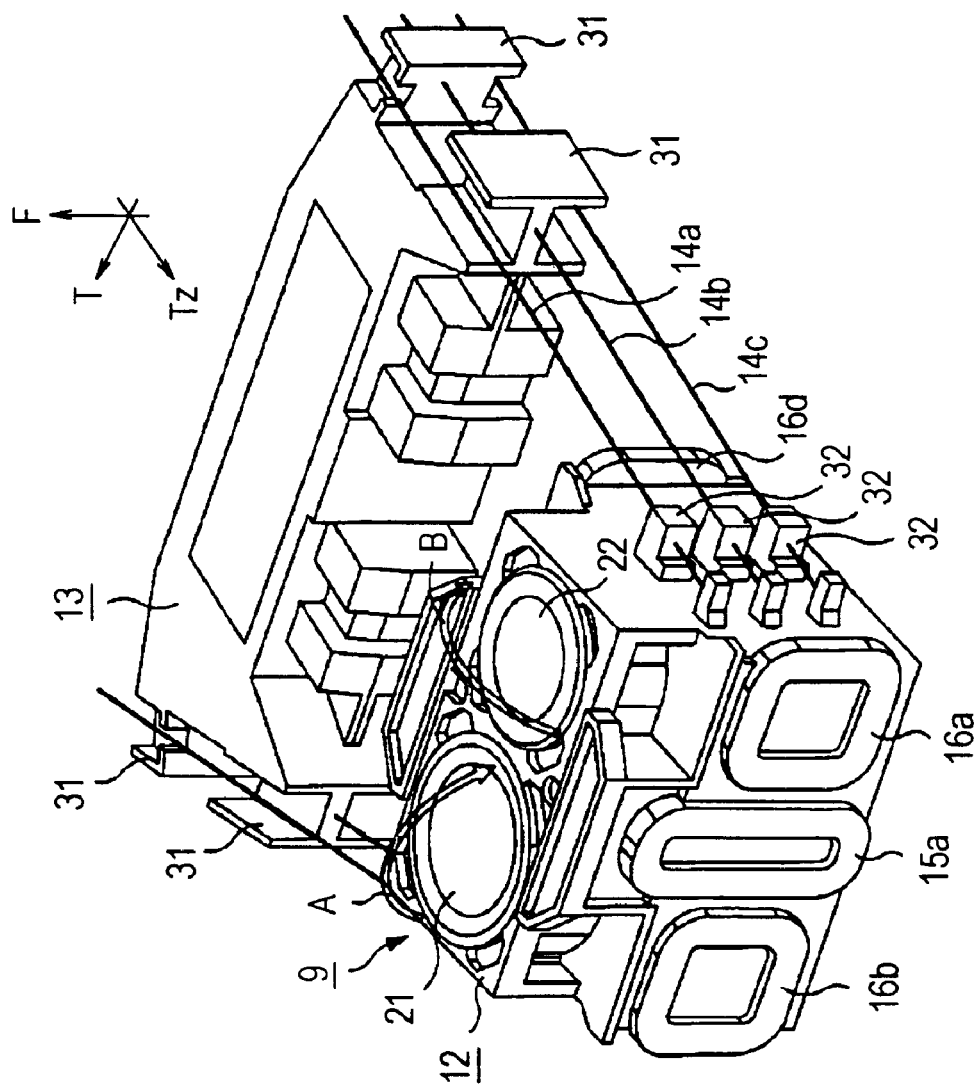
FIG. 4 is a perspective view illustrating a lens holder and a support that are included in the objective lens drive of the embodiment.

As illustrated in FIG. 3 and FIG. 4, the objective lens drive 9 includes a lens holder 12, a support 13, and support arms 14a to 14f. The lens holder 12 supports first and second objective lenses 21 and 22 that converge light beams emitted from the light source onto the optical disc 2. The support 13 is spaced from the lens holder 12 in a tangential direction Tz and is attached to the mounting base 10. The support arms 14a to 14f serve as elastic supporting members which allow connection between the lens holder 12 and the support 13. The lens holder 12 is a movable part that can move with respect to the support 13, which is a fixed part. The support arms 14a to 14f support the lens holder 12 such that it is movable with respect to the support 13 at least in a focusing direction F and in a tracking direction T. The first and second objective lenses 21 and 22 constitute part of the optical system of the optical pickup 7. With the lens holder 12, support 13, and support arms 14a to 14f described above, the objective lens drive 9 causes the first and second objective lenses 21 and 22 held by the lens holder 12 to move with respect to the signal recording surface of the optical disc 2 in the focusing direction F so as to perform focus adjustment, or in the tracking direction T so as to perform tracking adjustment. Thus, light beams can be focused through the first and second objective lenses 21 and 22 onto a predetermined recording track of the optical disc 2. As will be described below, the objective lens drive 9 may be provided with a means for driving the lens holder 12 further in a tilt direction. In this case, the objective lens drive 9 causes the first and second objective lenses 21 and 22 held by the lens holder 12 to move in the tilt direction so as to adjust a spot of light beams converged by the first and second objective lenses 21 and 22.

The first objective lens 21 is used, for example, to converge a light beam having a wavelength of 650 nm to 660 nm or a light beam having a wavelength of 760 nm to 800 nm onto the second optical disc or third optical disc, respectively. The second objective lens 22 is used, for example, to converge a light beam having a wavelength of 400 nm to 410 nm onto the first optical disc. In the lens holder 12, the first and second objective lenses 21 and 22 are arranged side by side in the radial direction (tracking direction T). The first objective lens 21 is provided at a position corresponding to the outer side of the optical disc 2, while the second objective lens 22 is provided at a position corresponding to the inner side of the optical disc 2.

Although the optical pickup 7 is configured such that the first and second objective lenses 21 and 22 are arranged side by side in the tracking direction T, the number and arrangement of objective lenses are not limited to this. For example, a plurality of objective lenses may be arranged in the tangential direction Tz.

As illustrated in FIG. 4, the lens holder 12 surrounds the rims of the first and second objective lenses 21 and 22. The lens holder 12 supports the first and second objective lenses 21 and 22 such that they are movable both in the focusing direction F parallel to their optical axes and in the tracking direction T orthogonal to their optical axes.

Figure 5:
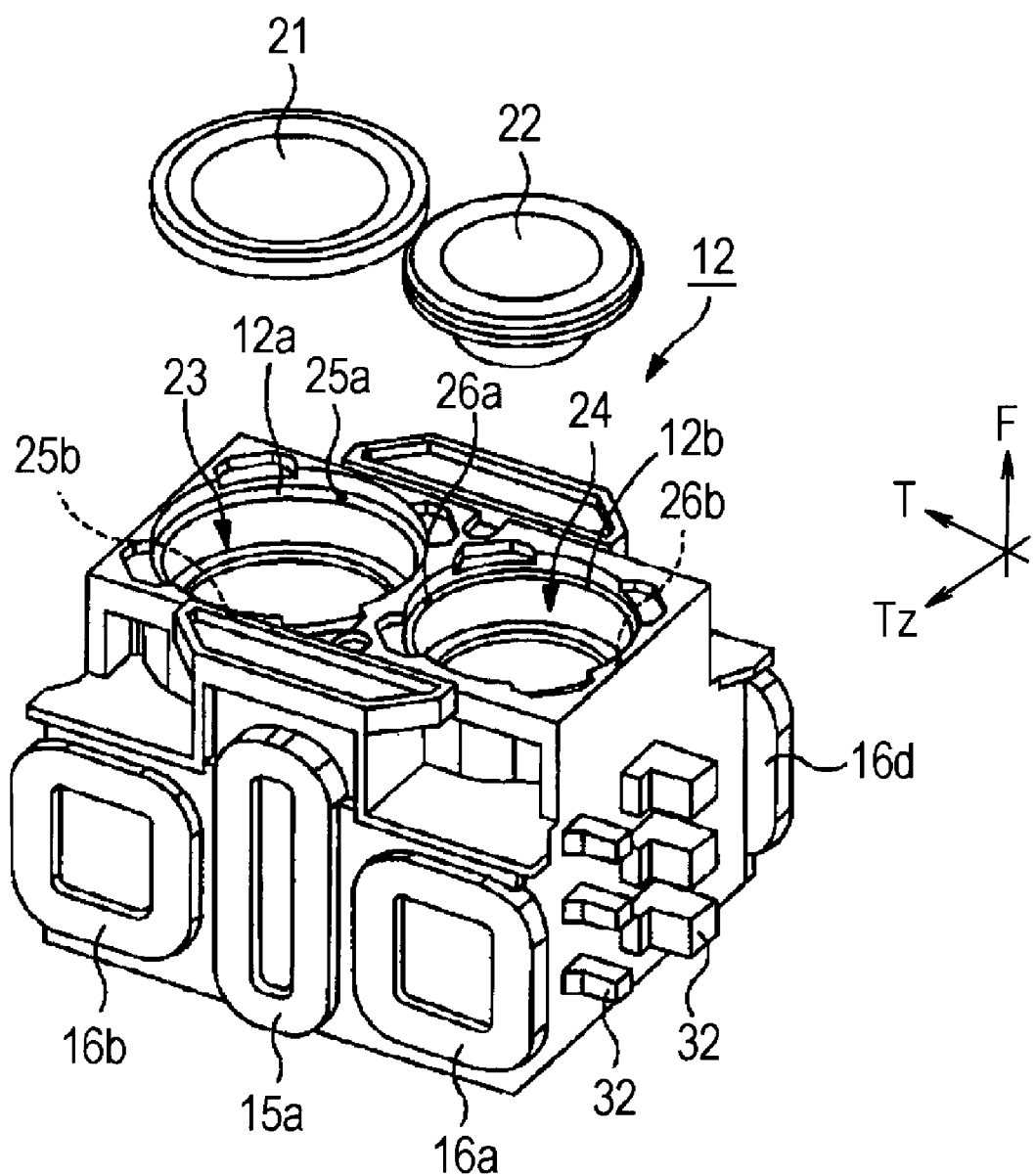
FIG. 5 is an exploded perspective view of the lens holder included in the objective lens drive of the embodiment.

As illustrated in FIG. 5, the lens holder 12 is provided with a first adjusting unit 23 and a second adjusting unit 24. The first adjusting unit 23 is provided at a portion to which the first objective lens 21 is attached and between the lens holder 12 and the first objective lens 21. The second adjusting unit 24 is provided at a portion to which the second objective lens 22 is attached and between the lens holder 12 and the second objective lens 22. The first adjusting unit 23 is provided to adjust a tilt of the first objective lens 21 in a direction about an axis in a first direction, while the second adjusting unit 24 is provided to adjust a tilt of the second objective lens 22 in a direction about an axis in a second direction. The first direction is any direction in a plane orthogonal to the focusing direction F. Here, the first direction is equivalent to the tangential direction Tz. The second direction is a direction in a plane orthogonal to the focusing direction F and is substantially orthogonal to the first direction. Here, the second direction is equivalent to the tracking direction T.

Figure 6:
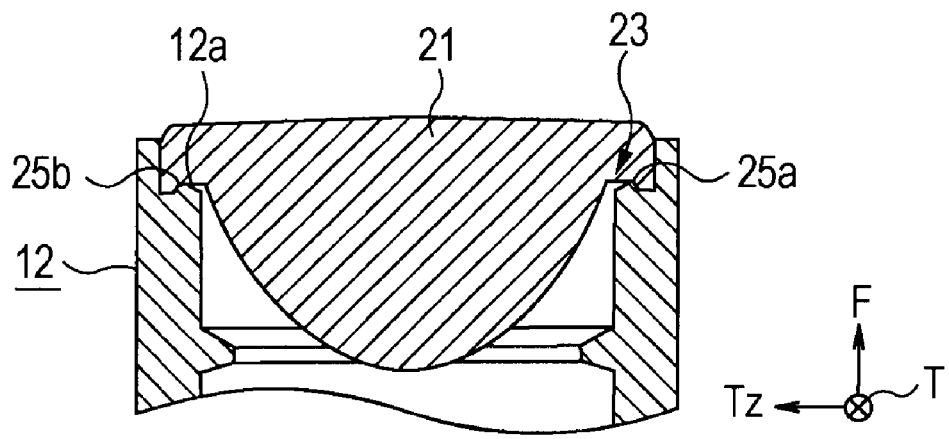
FIG. 6 is a cross-sectional view illustrating the lens holder, an objective lens held by the lens holder, and protrusions provided as adjusting means for adjusting a tilt of the objective lens.
Figure 7:
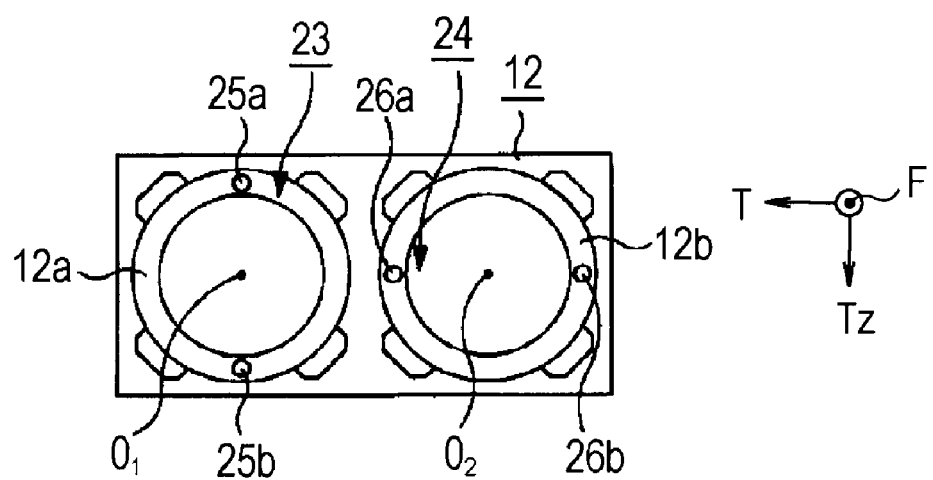
FIG. 7 is a schematic plan view illustrating the lens holder included in the objective lens drive of the embodiment, and the protrusions formed on the lens holder and serving as adjusting means.

Specifically, as illustrated in FIG. 5, FIG. 6, and FIG. 7, the first adjusting unit 23 is a pair of protrusions 25a and 25b formed on a flat attachment portion 12a of the lens holder 12 to which the first objective lens 21 is attached. The protrusions 25a and 25b are provided in the first direction (tangential direction Tz) and are opposite with respect to an optical axis $O_1$ of the first objective lens 21. That is, the protrusions 25a and 25b formed on the flat attachment portion 12a of the lens holder 12 are opposite with respect to the optical axis $O_1$ of the first objective lens 21 and are spaced apart by a predetermined distance in the first direction (tangential direction Tz).

Similarly, the second adjusting unit 24 is a pair of protrusions 26a and 26b formed on a flat attachment portion 12b of the lens holder 12 to which the second objective lens 22 is attached. The protrusions 26a and 26b are provided in the second direction (tracking direction T) and are opposite with respect to an optical axis $O_2$ of the second objective lens 22. That is, the protrusions 26a and 26b formed on the flat attachment portion 12b of the lens holder 12 are opposite with respect to the optical axis $O_2$ of the second objective lens 22 and are spaced apart by a predetermined distance in the second direction (tracking direction T). A cross section of the protrusions 26a and 26b (i.e., second adjusting unit 24) is not illustrated, as it is basically the same as that of the protrusions 25a and 25b (i.e., first adjusting unit 23) illustrated in FIG. 6.

As described above, the first adjusting unit 23 and the second adjusting unit 24 are provided by forming the protrusions 25a, 25b, 26a, and 26b on the lens holder 12, that is, by forming the protrusions 25a and 25b on the flat attachment portion 12a and forming the protrusions 26a and 26b on the flat attachment portion 12b. However, the configuration of the first adjusting unit 23 and second adjusting unit 24 is not limited to this. The first adjusting unit 23 and the second adjusting unit 24 may be provided by forming protrusions or the like on the first and second objective lenses 21 and 22, that is, by forming protrusions or the like at portions of the first objective lens 21, the portions coming into contact with the flat attachment portion 12a, and forming protrusions or the like at portions of the second objective lens 22, the portions coming into contact with the flat attachment portion 12b.

As illustrated in FIG. 6 and FIG. 7, the protrusions 25a, 25b, 26a, and 26b each have a shape such as that obtained by cutting a spherical object at a plane. However, the configuration of the protrusions 25a, 25b, 26a, and 26b is not limited to this. As will be described below, the protrusions 25a, 25b, 26a, and 26b each may have any shape which allows the first and second objective lenses 21 and 22 to tilt in a predetermined direction.

As illustrated in FIG. 4, FIG. 5, and FIG. 6, the protrusions 25a and 25b serving as the first adjusting unit 23 allow the first objective lens 21 to tilt about the axis extending between their tips in the direction of arrow A (see FIG. 4) orthogonal to the first direction (tangential direction Tz). Thus, the protrusions 25a and 25b adjust a tilt of the first objective lens 21 in the direction about the axis in the first direction (tangential direction Tz).

Similarly, the protrusions 26a and 26b serving as the second adjusting unit 24 allow the second objective lens 22 to tilt about the axis extending between their tips in the direction of arrow B (see FIG. 4) orthogonal to the second direction (tracking direction T). Thus, the protrusions 26a and 26b adjust a tilt of the second objective lens 22 in the direction about the axis in the second direction (tracking direction T).

As described above, the first adjusting unit 23 adjusts a tilt of the first objective lens 21 in the direction about the axis in the first direction (tangential direction Tz), while the second adjusting unit 24 adjusts a tilt of the second objective lens 22 in the direction about the axis in the second direction (tracking direction T). Thus, a relative angle between the optical axes of the first and second objective lenses 21 and 22 is adjusted. After this adjustment, the first and second objective lenses 21 and 22 are secured to the lens holder 12 with an adhesive or the like. Then, when the lens holder 12 to which the first and second objective lenses 21 and 22 are secured is attached through the support arms 14a to 14f to the support 13, a final adjustment of the optical axes of the first and second objective lenses 21 and 22 is performed.

Next, a method for adjusting tilts of the first and second objective lenses 21 and 22 will be described. Tilts of the first and second objective lenses 21 and 22 are adjusted, for example, using values detected by an angle detector or the amount of aberration of the first and second objective lenses 21 and 22.

Figure 8:
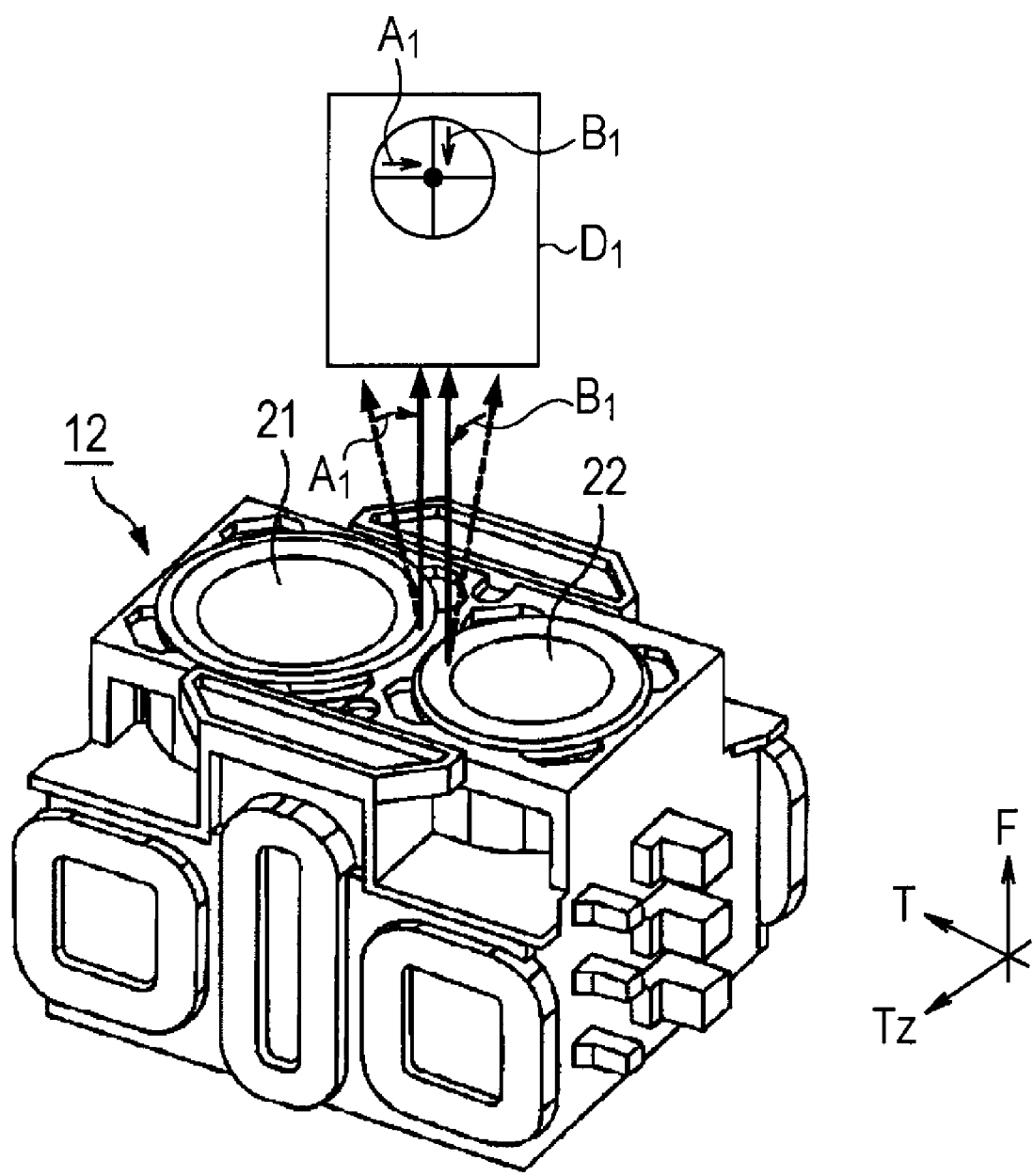
FIG. 8 illustrates, when a tilt adjustment of first and second objective lenses is performed using values detected by an angle detector, the relationship between the optical axis of each of the objective lenses and a detected angle value.

Specifically, for example, when values detected by an angle detector are used to perform tilt adjustment, light is applied to a portion orthogonal to the optical axes of the first and second objective lenses 21 and 22. Then, on the basis of the reflected light, a relative angle between the optical axes of the first and second objective lenses 21 and 22 is adjusted such that the optical axes become parallel to each other. That is, as illustrated in FIG. 8, the first adjusting unit 23 allows adjustment, for example, in direction $A_1$ such that a tilt of the first objective lens 21 in the direction about the axis in the first direction coincides with a tilt of the second objective lens 22 in the direction about the axis in the first direction. Then, the second adjusting unit 24 allows adjustment, for example, in direction $B_1$ such that a tilt of the second objective lens 22 in the direction about the axis in the second direction coincides with a tilt of the first objective lens 21 in the direction about the axis in the second direction. In FIG. 8, an area indicated by reference character $D_1$ shows a result of detection performed by the angle detector. In this area $D_1$, a point representing the optical axis of the first objective lens 21 coincides with a point representing the optical axis of the second objective lens 22. This means that by moving the optical axis of the first objective lens 21 and the optical axis of the second objective lens 22 in directions $A_1$ and $B_1$, respectively, these optical axes become parallel to each other.

As described above, when values detected by an angle detector or the like are used to perform tilt adjustment, the first and second adjusting units 23 and 24 can adjust the relative angle between the optical axes of the first and second objective lenses 21 and 22 such that these optical axes become parallel to each other.

Alternatively, for example, when tilt adjustment is to be performed through detection of the amount of aberration of the first and second objective lenses 21 and 22, predetermined light beams are made incident on the respective first and second objective lenses 21 and 22. Next, for example, coma aberration of the light beams having passed through the first and second objective lenses 21 and 22 is detected. Then, a relative angle between the optical axes of the first and second objective lenses 21 and 22 is adjusted such that an optimal skew state is achieved, in consideration of manufacturing errors of the first and second objective lenses 21 and 22. That is, the first adjusting unit 23 allows adjustment of a tilt of the first objective lens 21 in the direction about the axis in the first direction, and also allows adjustment of a tilt of the lens holder 12 in the direction about the axis in the second direction. Thus, an optimal skew state of the first objective lens 21 is achieved. At the same time, the second adjusting unit 24 allows adjustment of a tilt of the second objective lens 22 in the direction about the axis in the second direction, and also allows adjustment of a tilt of the lens holder 12 in the direction about the axis in the first direction. Thus, an optimal skew state of the second objective lens 22 is achieved.

Figure 9:
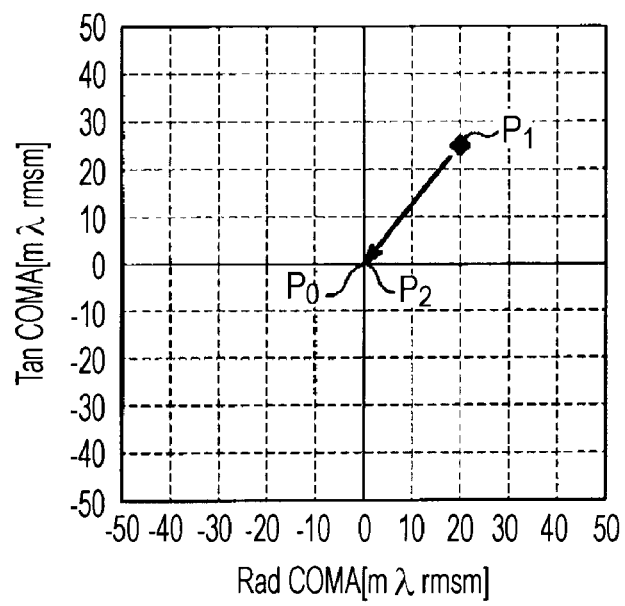
FIG. 9 illustrates, when a tilt adjustment of the first and second objective lenses is performed through detection of the amount of aberration of each of the objective lenses, the relationship between the aberration of one objective lens before the adjustment and the aberration of the same objective lens after the adjustment when the aberration of the other objective lens is zero.
Figure 10:
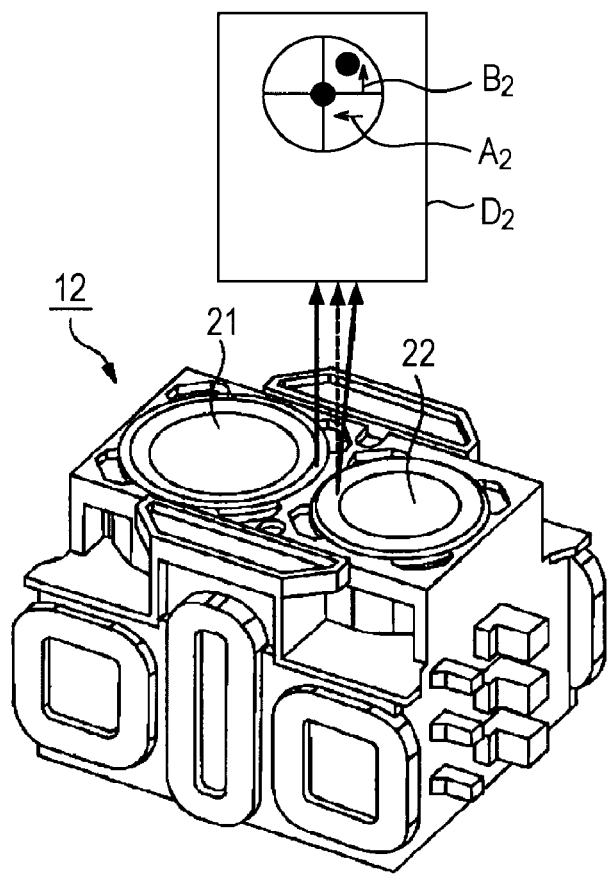
FIG. 10 illustrates, when a tilt adjustment of the first and second objective lenses is performed through detection of the amount of aberration of each of the objective lenses, the relationship between the optical axis of each of the objective lenses and a detected angle value.

For example, assume that when the optical axes of the first and second objective lenses 21 and 22 are parallel to each other as illustrated in FIG. 8 and neither of radial coma aberration and tangential coma aberration occurs in one objective lens, the other objective lens has radial coma aberration (Rad COMA) and tangential coma aberration (Tan COMA) as indicated by point $P_1$ of FIG. 9. From this state, if a tilt of the first objective lens 21 in the direction about the axis in the first direction is adjusted, for example, in direction $A_2$ (see FIG. 10), the radial coma aberration in the other objective lens can be reduced to zero when neither of radial coma aberration and tangential coma aberration occurs in the one objective lens. At the same time, from the state described above, if a tilt of the second objective lens 22 in the direction about the axis in the second direction is adjusted, for example, in direction $B_2$ (see FIG. 10), the tangential coma aberration in the other objective lens can be reduced to zero when neither of radial coma aberration and tangential coma aberration occurs in the one objective lens. That is, when the first and second adjusting units 23 and 24 allow adjustment of the relationship between the optical axes of the first and second objective lenses 21 and 22 and thus the state illustrated in FIG. 8 is changed, for example, to the state illustrated in FIG. 10, if neither of radial coma aberration and tangential coma aberration occurs in one objective lens as indicated by point $P_2$ of FIG. 9, both radial coma aberration and tangential coma aberration in the other objective lens can be reduced to zero. Although the above-described tilt adjustment based on the amount of aberration does not actually involve angle detection, an area indicated by reference character $D_2$ in FIG. 10 shows a result of hypothetical detection performed by an angle detector for illustrative purposes. If, as shown in area $D_2$, the optical axes of the first and second objective lenses 21 and 22 are moved in directions $A_2$ and $B_2$, respectively, the amount of aberration in both objective lenses can be minimized as shown in FIG. 9.

As described above, the first and second adjusting units 23 and 24 each allow adjustment of a single axis. That is, the first and second adjusting units 23 and 24 allow adjustment of the optical axes of the first and second objective lenses 21 and 22, respectively. However, since an axis of the first objective lens 21 in the first direction is substantially orthogonal to an axis of the second objective lens 22 in the second direction, a relative angle between the two objective lenses can be adjusted. That is, a relative adjustment between the optical axes of the first and second objective lenses 21 and 22 can be made possible.

In other words, the first and second adjusting units 23 and 24 allow adjustment of a relative tilt angle between the first and second objective lenses 21 and 22 according to performance of the optical pickup 7 and optical disc apparatus 1, manufacturing tolerances of the first and second objective lenses 21 and 22, and the like. This can make it possible to make the optical axes of the first and second objective lenses 21 and 22 parallel to each other, and to achieve optimal skew states of the first and second objective lenses 21 and 22.

As illustrated in FIG. 3, FIG. 4, and FIG. 5, first and second tracking coils 15a and 15b and first to fourth focusing coils 16a to 16d are attached to opposite sides of the lens holder 12, the opposite sides facing each other in the tangential direction Tz that is orthogonal to both the focusing direction F and the tracking direction T. The first and second tracking coils 15a and 15b generate a driving force in the tracking direction T, which is substantially a radial direction of the optical disc 2. The first to fourth focusing coils 16a to 16d generate a driving force in the focusing direction F, which is a direction toward or away from the optical disc 2. Here, the lens holder 12 is provided with the first and second tracking coils 15a and 15b and the first to fourth focusing coils 16a to 16d, and thus is driven in the tracking direction T and focusing direction F. However, the coil configuration is not limited to this. The lens holder 12 may further be provided with a tilt coil and driven in a tilt direction (radial tilt direction). The tilt coil generates a driving force in the tilt direction, which is a direction about an axis in the tangential direction Tz orthogonal to both the focusing direction F and the tracking direction T. Alternatively, with the above-described coil configuration remaining unchanged, the lens holder 12 may be configured to be driven in the tilt direction by creating a difference between the driving force of the first and second focusing coils 16a and 16b arranged side by side in the tracking direction T and the driving force of the third and fourth focusing coils 16c and 16d also arranged side by side in the tracking direction T.

Of opposite sides of the lens holder 12 which are spaced apart in the tracking direction T, one side is provided with arm supports 32 that support the support arms 14a, 14b, and 14c spaced in the focusing direction F, while the other side is provided with arm supports 32 that support the support arms 14d, 14e, and 14f also spaced in the focusing direction F. The support arms 14a to 14f serve as elastic supporting members which support the lens holder 12 such that it is movable with respect to the support 13 in the focusing direction F and the tracking direction T.

As illustrated in FIG. 3, a yoke 19 is disposed between the lens holder 12 and the mounting base 10 (see FIG. 2). The yoke 19 is attached to the moving base 8 and secured to the mounting base 10. An opening is provided at substantially the center of the yoke 19. The opening allows light beams incident on the first and second objective lenses 21 and 22 to pass through.

As illustrated in FIG. 3, a pair of yoke pieces 19a and 19b is formed to stand on opposite sides of the yoke 19 in the tangential direction Tz. The yoke pieces 19a and 19b face each other with the first and second objective lenses 21 and 22 interposed therebetween. First and second magnets 17 and 18 are attached to respective facing surfaces of the yoke pieces 19a and 19b. The first magnet 17 is arranged adjacent to the movable part, that is, the lens holder 12, while the second magnet 18 is arranged adjacent to the fixed part, that is, the support 13.

The first and second magnets 17 and 18 are arranged opposite each other in the tangential direction Tz with the lens holder 12 interposed therebetween. The first and second magnets 17 and 18 each have predetermined segments for forming desired magnetic fields for the respective coils 15a, 15b, and 16a to 16d.

Figure 11A:
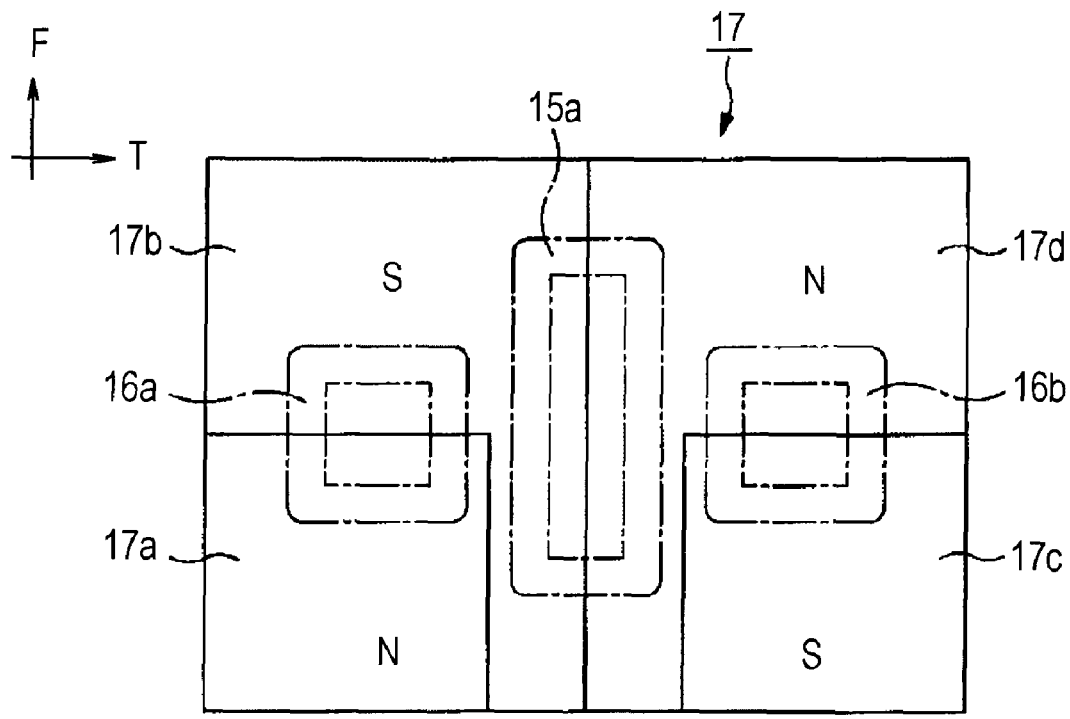
FIG. 11A and FIG. 11B each illustrate a magnetization pattern of a magnet included in the optical pickup of the embodiment.

As illustrated in FIG. 3 and FIG. 11A, the first magnet 17 faces the lens holder 12 in the tangential direction Tz. The first magnet 17 has first to fourth segments 17a, 17b, 17c, and 17d, each being magnetized toward one side of the tangential direction Tz.

The first segment 17a is substantially rectangular in shape and is magnetized such that its surface adjacent to the lens holder 12 has north polarity (N polarity). The second segment 17b has a portion adjacent to the first segment 17a in the focusing direction F and a portion adjacent to the first segment 17a in the tracking direction T. In other words, the second segment 17b is formed to surround the first segment 17a in the focusing direction F and tracking direction T. The second segment 17b is magnetized in the direction opposite the magnetization direction of the first segment 17a. That is, the second segment 17b is magnetized such that its surface adjacent to the lens holder 12 has south polarity (S polarity). The first and second segments 17a and 17b and the third and fourth segments 17c and 17d are symmetric with respect to the focusing direction F, and are magnetized oppositely.

The polarities (S and N polarities) of the first to fourth segments 17a to 17d of the first magnet 17 are not limited to those described above, but may be, for example, reversed.

Figure 11B:
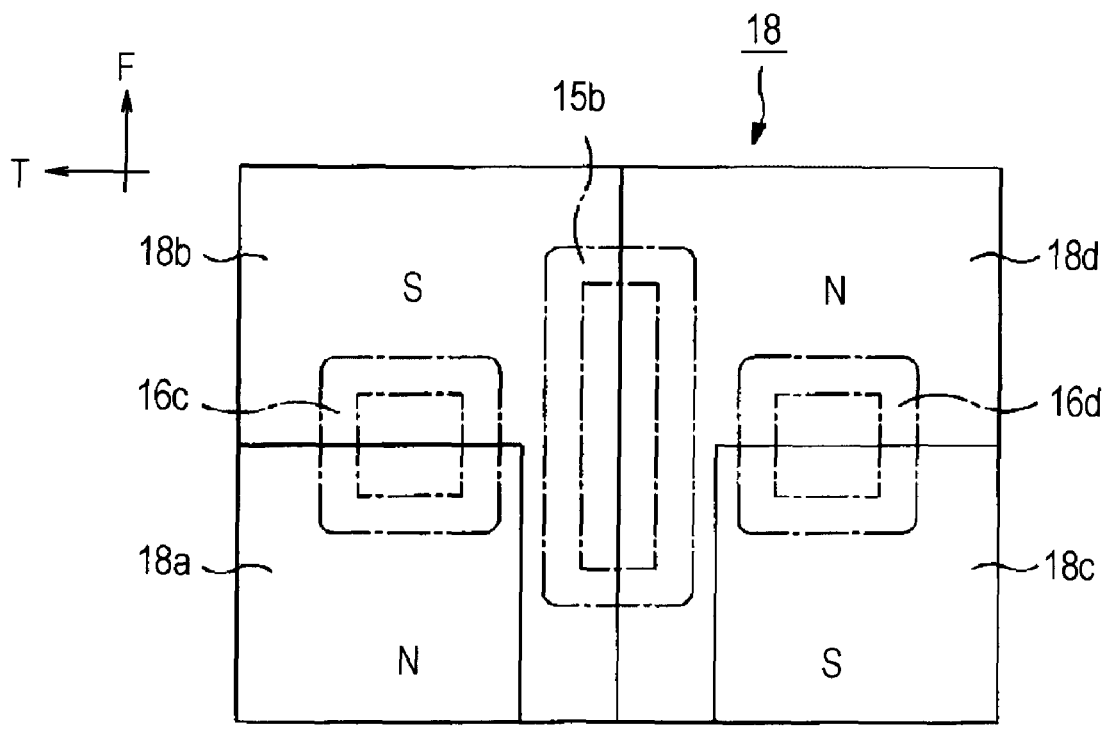

As illustrated in FIG. 3 and FIG. 11B, the second magnet 18 is disposed opposite the first magnet 17 in the tangential direction Tz with the lens holder 12 interposed therebetween. The second magnet 18 has fifth to eighth segments 18a, 18b, 18c, and 18d that are identical in shape to their corresponding segments of the first magnet 17.

The polarities (S and N polarities) of the fifth to eighth segments 18a to 18d of the second magnet 18 may be reversed.

As illustrated in FIG. 11A, FIG. 11B, and others, the first magnet 17 faces the first tracking coil 15a and first and second focusing coils 16a and 16b that are attached to one of opposite sides of the lens holder 12, while the second magnet 18 faces the second tracking coil 15b and third and fourth focusing coils 16c and 16d that are attached to the other of the opposite sides of the lens holder 12. Then, the first magnet 17 applies predetermined magnetic fields to the respective coils (15a, 16a, and 16b) facing the first magnet 17, while the second magnet 18 applies predetermined magnetic fields to the respective coils (15b, 16c, and 16d) facing the second magnet 18.

As illustrated in FIG. 11A and FIG. 11B, the first tracking coil 15a is disposed at a position opposite an area where the second and fourth segments 17b and 17d of the first magnet 17 are adjacent to each other in the tracking direction T, while the second tracking coil 15b is disposed at a position opposite an area where the sixth and eighth segments 18b and 18d of the second magnet 18 are adjacent to each other in the tracking direction T. Thus, according to a magnetic field formed by these segments and the direction and magnitude of current flowing through each of the first and second tracking coils 15a and 15b, a driving force is generated in the tracking direction T.

As illustrated in FIG. 11A, the first focusing coil 16a is disposed at a position opposite an area where the first and second segments 17a and 17b of the first magnet 17 are adjacent to each other in the focusing direction F, while the second focusing coil 16b is disposed at a position opposite an area where the third and fourth segments 17c and 17d of the first magnet 17 are adjacent to each other in the focusing direction F. Similarly, as illustrated in FIG. 11B, the third focusing coil 16c is disposed at a position opposite an area where the fifth and sixth segments 18a and 18b of the second magnet 18 are adjacent to each other in the focusing direction F, while the fourth focusing coil 16d is disposed at a position opposite an area where the seventh and eighth segments 18c and 18d of the second magnet 18 are adjacent to each other in the focusing direction F. Thus, according to a magnetic field formed by these segments and the direction and magnitude of current flowing through each of the first to fourth focusing coils 16a to 16d, a driving force is generated in the focusing direction F.

As described above, the first magnet 17 is disposed opposite the first tracking coil 15a and the first and second focusing coils 16a and 16b, while the second magnet 18 is disposed opposite the second tracking coil 15b and the third and fourth focusing coils 16c and 16d. When this configuration allows drive current for a tracking operation to be supplied to each of the first and second tracking coils 15a and 15b, the interactions of the drive current supplied to each tracking coil and a magnetic field from each of the first and second magnets 17 and 18 cause the lens holder 12 to be displaced in the tracking direction T. Additionally, when the above-described configuration allows drive current for a focusing operation to be supplied to each of the first to fourth focusing coils 16a to 16d, the interactions of the drive current supplied to each focusing coil and a magnetic field from each of the first and second magnets 17 and 18 cause the lens holder 12 to be displaced in the focusing direction F.

This allows both focusing control and tracking control to be performed. More specifically, the focusing control causes the first and second objective lenses 21 and 22 supported by the lens holder 12 to be displaced in the focusing direction F or tracking direction T, and further causes a light beam applied through the first and second objective lenses 21 and 22 to the optical disc 2 to be focused onto the signal recording surface of the optical disc 2. Additionally, the tracking control causes the light beam to follow a recording track formed on the optical disc 2.

As illustrated in FIG. 4, the support 13 is disposed opposite the lens holder 12 and has a length along the tracking direction T and a height along the focusing direction F.

One of opposite sides of the support 13 that are spaced apart in the tracking direction T is provided with arm supports 31 which support the support arms 14a, 14b, and 14c spaced apart in the focusing direction F, while the other of the opposite sides of the support 13 that are spaced apart in the tracking direction T is also provided with arm supports 31 which support the support arms 14d, 14e, and 14f spaced apart in the focusing direction F. A printed wiring board (not shown) is mounted on a back surface of the support 13 remote from the lens holder 12. Drive current for a focusing operation and that for a tracking operation are supplied from a control circuit to the printed wiring board.

The arm supports 32 on opposite sides of the lens holder 12 in the tracking direction T are connected to their corresponding arm supports 31 on opposite sides of the support 13 in the tracking direction T by the support arms 14a, 14b, and 14c on one side and by the support arms 14d, 14e, and 14f on the other side. As illustrated in FIG. 3 and FIG. 4, the support arms 14a, 14b, and 14c on one side are spaced apart and parallel to each other in the focusing direction F, while the support arms 14d, 14e, and 14f on the other side are also spaced apart and parallel to each other in the focusing direction F. The support arms 14a to 14f support the lens holder 12 such that it is movable with respect to the support 13 in both the focusing direction F and the tracking direction T. The support arms 14a to 14f are linear members having conductivity and elasticity.

Next, there will be described focusing control and tracking control which are performed for the lens holder 12 in the objective lens drive 9 and optical pickup 7 configured as described above. When drive current corresponding to a focusing control signal generated from a reproduced signal is supplied to the first to fourth focusing coils 16a to 16d, a force generated by the interaction of current flowing through the first to fourth focusing coils 16a to 16d, the yoke 19 and yoke pieces 19a and 19b, and a magnetic field formed by the first and second magnets 17 and 18 supported by the yoke pieces 19a and 19b allows the generation of a force which causes the lens holder 12 to move up or down parallel to the optical axes of the first and second objective lenses 21 and 22 according to the direction of the drive current. The lens holder 12 is supported by end portions of the six support arms 14a to 14f. Therefore, when subjected to a force in the up-and-down direction, the lens holder 12 moves up and down while remaining parallel to the optical disc 2 rotated by the spindle motor and the disc table 4. Thus, the first and second objective lenses 21 and 22 are focusing-controlled along their optical axes, and light spots from the first and second objective lenses 21 and 22 are focused on a track of the optical disc 2.

At the same time, when drive current corresponding to a tracking control signal generated from a reproduced signal is supplied to the first and second tracking coils 15a and 15b, a force generated by the interaction of current flowing through the first and second tracking coils 15a and 15b, the yoke 19 and yoke pieces 19a and 19b, and a magnetic field formed by the first and second magnets 17 and 18 supported by the yoke pieces 19a and 19b allows the generation of a force which causes the lens holder 12 to move in the direction of the radius of the optical disc 2 rotated by the spindle motor and the disc table 4 according to the direction of the drive current. The lens holder 12 is supported by end portions of the six support arms 14a to 14f. Therefore, when subjected to a force in a direction parallel to the plane of the optical disc 2, the lens holder 12 is displaced in a direction substantially parallel to the direction of the normal to recording tracks formed on the optical disc 2. This allows tracking control which causes the first and second objective lenses 21 and 22 to move in the direction of the radius of the optical disc 2. Thus, a light beam from the first and second objective lenses 21 and 22 can trace a desired recording track on the optical disc 2.

The objective lens drive 9 and optical pickup 7 including the objective lens drive 9 configured as described above have the first to fourth focusing coils 16a to 16d, the first and second tracking coils 15a and 15b, and the first and second magnets 17 and 18. Therefore, it is possible to displace the first and second objective lenses 21 and 22 held by the lens holder 12 in the focusing direction F and tracking direction T by elastically displacing the support arms 14a to 14f.

In the objective lens drive 9 according to at least one embodiment of the present invention, the first adjusting unit 23 which allows adjustment of a tilt of the first objective lens 21 in the direction about the axis in the first direction and the second adjusting unit 24 which allows adjustment of a tilt of the second objective lens 22 in the direction about the axis in the second direction make it possible to adjust a relative attachment angle between the first and second objective lenses 21 and 22. In other words, the objective lens drive 9 according to at least one embodiment of the present invention makes it possible to adjust a relative attachment angle between the first and second objective lenses 21 and 22 without increasing the number of components and weight associated with the installation of a known spherical washer or the like and without involving complicated adjustment processes. By adjusting a relative attachment angle between the first and second objective lenses 21 and 22 having different specifications, it is possible, with a reduced number of components, a simple configuration, and simple adjustment processes, to make the optical axes of the first and second objective lenses 21 and 22 parallel to each other and to perform skew adjustment such that the aberration of each objective lens is minimized in consideration of component accuracy and the like.

In the optical pickup 7 according to at least one embodiment of the present invention, the first and second adjusting units 23 and 24 included in the objective lens drive 9 make it possible to adjust a relative attachment angle between the first and second objective lenses 21 and 22. That is, the optical pickup 7 according to at least one embodiment of the present invention allows easy adjustment of attachment angles of a plurality of objective lenses (first and second objective lenses 21 and 22) with a simple configuration. Therefore, this plurality of objective lenses can provide compatibility with various types of optical discs and make it possible to achieve good recording/reproducing performance with respect to each of the optical discs.

In the optical disc apparatus 1 which includes the optical pickup 7 described above, the first and second adjusting units 23 and 24 included in the objective lens drive 9 make it possible to adjust a relative attachment angle between the first and second objective lenses 21 and 22. Therefore, the optical disc apparatus 1 according to at least one embodiment of the present invention allows high-quality recording and/or reproduction of an information signal to be performed on various types of optical discs.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens drive comprising:
    a lens holder to which a first objective lens and a second objective lens that have different specifications are attached, the lens holder being moved at least in a focusing direction substantially parallel to optical axes of the first and second objective lenses and in a tracking direction orthogonal to the focusing direction;
    a support configured to movably support the lens holder at least in the focusing direction and in the tracking direction;
    first adjusting means, which is provided between the first objective lens and the lens holder, for adjusting a tilt of the first objective lens in a direction about an axis in a first direction that is any direction in a plane orthogonal to the focusing direction; and
    second adjusting means, which is provided between the second objective lens and the lens holder, for adjusting a tilt of the second objective lens in a direction about an axis in a second direction that is in a plane orthogonal to the focusing direction and is substantially orthogonal to the first direction,
    wherein a relative angle between the first and second objective lenses is adjusted by tilt adjustment that is made possible by the first and second adjusting means.

2. The objective lens drive according to claim 1, wherein the first adjusting means is a pair of protrusions that are provided on either one of the first objective lens and the lens holder, and are formed opposite in the first direction with respect to the optical axis of the first objective lens; and
    the second adjusting means is a pair of protrusions that are provided on either one of the second objective lens and the lens holder, and are formed opposite in the second direction with respect to the optical axis of the second objective lens.

3. An optical pickup comprising:
    a first objective lens and a second objective lens that have different specifications and are capable of converging light beams onto a signal recording surface of various types of optical discs rotated by a driving force; and
    an objective lens drive configured to drive the first and second objective lenses,
    wherein the objective lens drive includes
        a lens holder to which the first objective lens and the second objective lens are attached, the lens holder being moved at least in a focusing direction substantially parallel to optical axes of the first and second objective lenses and in a tracking direction orthogonal to the focusing direction;
        a support configured to movably support the lens holder at least in the focusing direction and in the tracking direction;
        first adjusting means, which is provided between the first objective lens and the lens holder, for adjusting a tilt of the first objective lens in a direction about an axis in a first direction that is any direction in a plane orthogonal to the focusing direction; and
        second adjusting means, which is provided between the second objective lens and the lens holder, for adjusting a tilt of the second objective lens in a direction about an axis in a second direction that is in a plane orthogonal to the focusing direction and is substantially orthogonal to the first direction,
wherein a relative angle between the first and second objective lenses is adjusted by tilt adjustment that is made possible by the first and second adjusting means.

4. An optical disc apparatus comprising:
drive means for holding and rotating various types of optical discs; and
an optical pickup configured to emit a light beam for recording or reproducing an information signal on or from an optical disc rotated by the drive means, and to detect a light beam reflected off the optical disc,
wherein the optical pickup includes
a first objective lens and a second objective lens that have different specifications and are capable of converging light beams onto a signal recording surface of various types of optical discs rotated by a driving force; and
an objective lens drive configured to drive the first and second objective lenses,
wherein the objective lens drive includes
a lens holder to which the first objective lens and the second objective lens are attached, the lens holder being moved at least in a focusing direction substantially parallel to optical axes of the first and second objective lenses and in a tracking direction orthogonal to the focusing direction;
a support configured to movably support the lens holder at least in the focusing direction and in the tracking direction;
first adjusting means, which is provided between the first objective lens and the lens holder, for adjusting a tilt of the first objective lens in a direction about an axis in a first direction that is any direction in a plane orthogonal to the focusing direction; and
second adjusting means, which is provided between the second objective lens and the lens holder, for adjusting a tilt of the second objective lens in a direction about an axis in a second direction that is in a plane orthogonal to the focusing direction and is substantially orthogonal to the first direction,
wherein a relative angle between the first and second objective lenses is adjusted by tilt adjustment that is made possible by the first and second adjusting means.

* * * * *